(12) United States Patent
Kim et al.

(10) Patent No.: US 10,700,381 B2
(45) Date of Patent: Jun. 30, 2020

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Ha Eun Kim, Daejeon (KR); Young Min Lim, Daejeon (KR); Gwang Yeon Kim, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 137 days.

(21) Appl. No.: 16/085,333

(22) PCT Filed: Jan. 18, 2018

(86) PCT No.: PCT/KR2018/000873
§ 371 (c)(1),
(2) Date: Sep. 14, 2018

(87) PCT Pub. No.: WO2018/135889
PCT Pub. Date: Jul. 26, 2018

(65) Prior Publication Data
US 2019/0089004 A1  Mar. 21, 2019

(30) Foreign Application Priority Data

Jan. 20, 2017 (KR) .................. 10-2017-0010043
Jan. 17, 2018 (KR) .................. 10-2018-0006125

(51) Int. Cl.
| H01M 10/0567 | (2010.01) |
| H01M 10/0569 | (2010.01) |
| H01M 4/505 | (2010.01) |
| H01M 4/525 | (2010.01) |
| H01M 10/0525 | (2010.01) |

(52) U.S. Cl.
CPC ....... *H01M 10/0569* (2013.01); *H01M 4/505* (2013.01); *H01M 4/525* (2013.01); *H01M 10/0525* (2013.01); *H01M 10/0567* (2013.01); *H01M 2300/0025* (2013.01)

(58) Field of Classification Search
None
See application file for complete search history.

(56) References Cited

U.S. PATENT DOCUMENTS

| 2014/0120414 A1 | 5/2014 | Bhat et al. |
| 2016/0211553 A1 | 7/2016 | Ito et al. |
| 2017/0222264 A1 | 8/2017 | Morinaka et al. |

FOREIGN PATENT DOCUMENTS

| JP | 2004055502 A | 2/2004 |
| JP | 2010116475 A | 5/2010 |
| JP | 2015195135 A | 11/2015 |
| JP | 2016035820 A | 3/2016 |
| JP | 2016184579 A | 10/2016 |
| JP | 2017063019 A | 3/2017 |
| JP | 2017117684 A | 6/2017 |
| KR | 20120011209 A | 2/2012 |
| KR | 20160002314 A | 1/2016 |
| KR | 20160036810 A | 4/2016 |
| KR | 20160044056 A | 4/2016 |
| KR | 101683534 B1 | 12/2016 |
| KR | 20170033437 A | 3/2017 |
| WO | 2016017404 A1 | 2/2016 |
| WO | 2018135889 A1 | 7/2018 |

OTHER PUBLICATIONS

International Search Report for Application No. PCT/KR2018/000873 dated Apr. 25, 2018.
Extended European Search Report for EP18741574.0 dated Mar. 21, 2019.

*Primary Examiner* — Wojciech Haske
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery and a lithium secondary battery including the same, and particularly, to a non-aqueous electrolyte solution for a lithium secondary battery which includes an ionizable lithium salt, an organic solvent, and an additive, wherein the additive includes tetravinylsilane, lithium difluorophosphate, and 1,3-propylene sulfate in a weight ratio of 1:3 to 20:3 to 20, and a total amount of the additive is in a range of 1 wt % to 4 wt % based on a total weight of the non-aqueous electrolyte solution for a lithium secondary battery, and a lithium secondary battery including the same.

11 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/000873, filed on Jan. 18, 2018, which claims the benefit of Korean Patent Application Nos. 10-2017-0010043, filed on Jan. 20, 2017, and 10-2018-0006125, filed on Jan. 17, 2018, the disclosures of which are incorporated herein by reference.

Technical Field

The present invention relates to a non-aqueous electrolyte solution for a lithium secondary battery and a lithium secondary battery including the same.

BACKGROUND ART

Recently, interests in energy storage technologies have been increasingly grown, and efforts for the development of high-capacity electrochemical devices have been gradually materialized as the application of the energy storage technologies is expanded to mobile phones, camcorders, notebook PCs, and even to electric vehicles.

There emerges an interest in rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery is composed of a carbon negative electrode capable of intercalating and deintercalating lithium ions, a positive electrode formed of a lithium-containing composite oxide, and a non-aqueous electrolyte solution in which a lithium salt is dissolved in a mixed organic solvent.

In the lithium secondary battery, lithium ions react with the electrolyte solution in a voltage range of 0.5 V to 3.5 V during initial charge to form compounds, such as $Li_2CO_3$, $Li_2O$, and LiOH, and a solid electrolyte interface (SEI), as a kind of a passivation layer, is formed on the surface of the negative electrode by these compounds.

The SEI film formed at an initial stage of charging may prevent a reaction of the lithium ions with the carbon negative electrode or other materials during charge and discharge. Also, the SEI film may only pass the lithium ions by acting as an ion tunnel. Since the ion tunnel may prevent the destruction of a structure of the carbon negative electrode due to the co-intercalation of the carbon negative electrode and the non-aqueous organic solvents having a high molecular weight which solvate lithium ions and moves therewith, cycle life characteristics and output characteristics of the lithium secondary battery may be improved.

In a case in which the organic solvent used in the non-aqueous electrolyte solution of the lithium secondary battery is generally stored for a long period of time at high temperature, gas is generated due to the occurrence of a side reaction of the organic solvent with a transition metal oxide of a discharged positive electrode active material. Furthermore, the negative electrode is exposed while the SEI film is gradually collapsed during high-temperature storage in a fully charged state (e.g., storage at 60° C. after charged to 100% at 4.2 V), and the exposed negative electrode continuously reacts with the electrolyte solution to generate gases, such as CO, $CO_2$, $CH_4$, and $C_2H_6$.

Battery swelling and deformation of an electrode assembly occur while an internal pressure of the battery is increased by the gas thus generated, and, as a result, the battery may be deteriorated due to internal short circuit of the battery, or fire or explosion of the battery may occur.

In order to address these limitations, there is a need to develop an electrolyte solution for a lithium secondary battery which may suppress the side reaction during high-temperature storage.

Priot Art Documents

Japanese Patent Application Laid-open Publication No. 2010-116475

DISCLOSURE OF THE INVENTION

Technical Problem

An aspect of the present invention provides a non-aqueous electrolyte solution for a lithium secondary battery which includes an additive capable of forming a stable layer on the surface of an electrode and suppressing an electrolyte solution side reaction during high-temperature storage.

Another aspect of the present invention provides a lithium secondary battery in which high-temperature storage characteristics and cycle life characteristics are improved by including the non-aqueous electrolyte solution for a lithium secondary battery.

Technical Solution

According to an aspect of the present invention, there is provided a non-aqueous electrolyte solution for a lithium secondary battery including an ionizable lithium salt; an organic solvent; and an additive, wherein the additive is a mixed additive which includes tetravinylsilane (TVS), lithium difluorophosphate (LiDFP), and 1,3-propylene sulfate (PPS) in a weight ratio of 1:3 to 20:3 to 20, and the additive is included in an amount of 1 wt % to 4 wt % based on a total weight of the non-aqueous electrolyte solution for a lithium secondary battery.

The weight ratio of the tetravinylsilane:the lithium difluorophosphate:the 1,3-propylene sulfate, as an additive, may be in a range of 1:3 to 17:5 to 20, for example, 1:5 to 15:5 to 20.

Also, the additive may be included in an amount of 1.8 wt % to 4 wt % based on the total weight of the non-aqueous electrolyte solution for a lithium secondary battery.

Furthermore, the non-aqueous electrolyte solution of the present invention may further include at least one additional additive selected from the group consisting of vinylene carbonate (VC), $LiBF_4$, 1,3-propane sultone, and tetraphenylborate.

The additional additive may be included in an amount of 0.1 wt % to 5 wt % based on the total weight of the non-aqueous electrolyte solution for a lithium secondary battery.

In a case in which the 1,3-propane sultone (PS) is included as the additional additive, the tetravinylsilane and the 1,3-propane sultone (PS) may be included at a weight ratio of 1:5 to 1:15.

Also, in a case in which the VC or LiBF$_4$ is included as the additional additive, the tetravinylsilane and the VC or LiBF$_4$ may be included at a weight ratio of 1:1 to 1:3.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention, and the positive electrode includes a lithium-nickel-manganese-cobalt-based oxide as a positive electrode active material.

Specifically, the positive electrode active material may include a lithium transition metal oxide represented by Formula 1 below.

$$Li(Ni_aCo_bMn_c)O_2 \qquad [\text{Formula 1}]$$

wherein, in Formula 1, 0.55≤a≤0.9, 0.05≤b≤0.22, 0.05≤c≤0.23, and a+b+c=1.

Typical examples of the positive electrode active material may be at least one of Li(Ni$_{0.6}$Mn$_{0.2}$Co$_{0.2}$)O$_2$, Li(Ni$_{0.7}$Mn$_{0.15}$Co$_{0.15}$)O$_2$, and Li(Ni$_{0.8}$Mn$_{0.1}$Co$_{0.1}$)O$_2$.

Advantageous Effects

In the present invention, since a stable solid electrolyte interface (SEI) film may be formed on the surface of a negative electrode by including a mixed additive in which three types of compounds are mixed in a specific ratio, a non-aqueous electrolyte solution for a lithium secondary battery, in which a side reaction during high-temperature storage is suppressed, may be prepared. Also, a lithium secondary battery may be prepared in which high-temperature storage characteristics and cycle life characteristics are improved by including the non-aqueous electrolyte solution.

MODE FOR CARRYING OUT THE INVENTION

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is a non-aqueous electrolyte solution for a lithium secondary battery including:

an ionizable lithium salt; an organic solvent, and an additive, wherein the additive is a mixed additive which includes tetravinylsilane (TVS), lithium difluorophosphate (LiDFP), and 1,3-propylene sulfate (PPS) in a weight ratio of 1:3 to 20:3 to 20, and the additive is included in an amount of 1 wt % to 4 wt % based on a total weight of the non-aqueous electrolyte solution for a lithium secondary battery.

First, in the non-aqueous electrolyte solution for a lithium secondary battery according to the embodiment of the present invention, any lithium salt typically used in an electrolyte solution for a lithium secondary battery may be used as the ionizable lithium salt without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, B$_{10}$Cl$_{10}^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, CH$_3$SO$_3^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$ as an anion. Specifically, the lithium salt may include a single material selected from the group consisting of LiCl, LiBr, LiI, LiClO$_4$, LiBF$_4$, LiB$_{10}$Cl$_{10}$, LPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, and LiCH$_3$SO$_3$, or a mixture of two or more thereof, and, in addition thereto, a lithium salt, such as a lithium imide salt represented by lithium bisperfluoroethanesulfonimide (LiBETI, LiN(SO$_2$C$_2$F$_5$)$_2$), lithium fluorosulfonyl imide (LiFSI, LiN(SO$_2$F)$_2$), and lithium (bis)trifluoromethanesulfonimide (LiTFSI, LiN(SO$_2$CF$_3$)$_2$) which are typically used in the electrolyte solution of the lithium secondary battery, may be used without limitation. Specifically, the lithium salt may include a single material selected from the group consisting of LiPF$_6$, LiBF$_4$, LiCH$_3$CO$_2$, LiCF$_3$CO$_2$, LiCH$_3$SO$_3$, LiFSI, LiTFSI, and LiBETI, or a mixture of two or more thereof. However, the lithium salt does not include LiDFP which is included as the mixed additive.

The lithium salt may be appropriately changed in a normally usable range, but may specifically be included in a concentration of 0.1 M to 3 M, for example, 0.8 M to 2.5 M in the electrolyte solution. In a case in which the concentration of the lithium salt is greater than 3 M, a film-forming effect may be reduced.

Also, in the non-aqueous electrolyte solution for a lithium secondary battery according to the embodiment of the present invention, a type of the organic solvent is not limited as long as it may minimize decomposition due to an oxidation reaction during charge and discharge of the secondary battery and may exhibit desired characteristics with the additive. For example, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof, and the cyclic carbonate compound may specifically include any one selected from the group consisting of ethylene carbonate, 1,2-butylene carbonate, 2,3-butylene carbonate, vinylene carbonate, and fluoroethylene carbonate (FEC), or a mixture of two or more thereof.

With respect to propylene carbonate (PC) among the cyclic carbonate compounds, since the propylene carbonate causes an irreversible decomposition reaction with a carbon-based negative electrode material and an electrode exfoliation phenomenon caused by the propylene carbonate occurs during high-temperature cycling depending on a thickness of the electrode, capacity of the lithium secondary battery may be reduced. Particularly, in a case in which the propylene carbonate is used with the lithium salt such as LiPF$_6$, since the solvated propylene carbonate are not separated from lithium ions in a process of forming the SEI film on the surface of the carbon-based negative electrode and a process of intercalating the lithium ions solvated by the propylene carbonate between carbon layers, the solvated propylene carbonate and the lithium ions are intercalated while breaking the negative electrode layers, and thus, an enormous amount of irreversible reaction may occur. In addition, since a robust SEI film is not formed on the surface of the negative electrode, working of the lithium secondary battery may not be smooth.

Thus, the non-aqueous electrolyte solution for a lithium secondary battery of the present invention may have an effect of improving high-temperature storage characteristics and cycle characteristics by including ethylene carbonate having a high melting point, as an essential component, instead of including propylene carbonate as the cyclic carbonate compound.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, and the linear carbonate compound may specifically include any one selected from the group consisting of dimethyl carbonate, diethyl carbonate, dipropyl carbonate, and ethylmethyl carbonate, or a mixture of two or more thereof.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

It is known that the cyclic carbonate-based compound among the ester-based solvents is a solvent which well dissociates the lithium salt in the electrolyte due to high permittivity as a highly viscous organic solvent. Also, an electrolyte solution having high electrical conductivity may be prepared when the cyclic carbonate-based compound is mixed with the low viscosity, low permittivity linear carbonate-based compound, such as dimethyl carbonate and diethyl carbonate, and the linear ester-based compound in an appropriate ratio.

The cyclic carbonate-based compound and the linear carbonate-based compound may be mixed and used as the organic solvent, and a weight ratio of the cyclic carbonate-based compound:the linear carbonate-based compound in the organic solvent may be in a range of 10:90 to 70:30.

Also, in the non-aqueous electrolyte solution for a lithium secondary battery according to the embodiment of the present invention, tetravinylsilane (TVS) represented by the following Formula 2, as one of the additive components, is a compound that may form a robust SEI film on the surface of the negative electrode through physical adsorption and electrochemical reaction, wherein, since an increase in resistance caused by an additional reaction of the electrolyte solution at high temperature may be suppressed by the tetravinylsilane, the tetravinylsilane may improve durability of the lithium secondary battery during high-temperature storage.

[Formula 2]

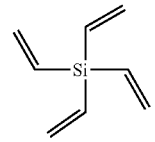

Furthermore, lithium difluorophosphate represented by the following Formula 3, as one of the additive components, is a component which is electrochemically decomposed on the surfaces of positive electrode and negative electrode to help the formation of the SEI. The lithium difluorophosphate may have an effect of improving long-term cycle life characteristics of the secondary battery.

[Formula 3]

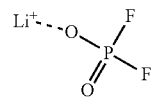

Also, as one of the additive components, 1,3-propylene sulfate represented by the following Formula 4 may form a stable protective layer on the surface of the negative electrode which does not crack even during high-temperature storage. The negative electrode coated with the protective layer may prevent gas generation by suppressing the decomposition of the non-aqueous organic solvent by a negative electrode active material even in a case in which a highly crystallized carbon material, such as natural graphite or artificial graphite, is used as the negative electrode active material or even during high-temperature storage. Furthermore, the protective layer does not interfere with a charge/discharge reaction of the battery. Thus, performance, such as cycle life, capacity, and resistance, as well as stabilities at room temperature and high temperature of the secondary battery may be improved.

[Formula 4]

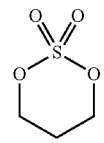

Furthermore, as the mixed additive, the tetravinylsilane, the lithium difluorophosphate, and the 1,3-propylene sulfate may specifically be included in a weight ratio of 1:3 to 17:5 to 20, for example, 1:5 to 15:5 to 20.

In a case in which the weight ratio of the tetravinylsilane is greater than the above range, since the surplus tetravinylsilane causes a side reaction to increase the resistance of the battery, cycle life characteristics may be reduced. In contrast, the weight ratio of the tetravinylsilane is less than the above range, a gas generation reducing effect and a SEI film forming effect are insignificant.

Also, in a case in which the weight ratio of the lithium difluorophosphate is greater than 20 or the weight ratio of the 1,3-propylene sulfate is greater than 20 based on 1 part by weight of the tetravinylsilane, since internal resistance of the battery is increased due to the excessive use of the additive, the cycle life characteristics are reduced.

In a case in which the weight ratio of the lithium difluorophosphate and 1,3-propylene sulfate is less than 3 based on 1 part by weight of the tetravinylsilane, since a stabilizing effect during the formation of the SEI film is insignificant, the high-temperature storage characteristics and cycle life characteristics may be reduced.

From these results, in the non-aqueous electrolyte solution of the present invention, in a case in which the weight ratio of the compounds constituting the mixed additive satisfies the above range, a stable SEI film may be formed without an increase in the resistance, and, accordingly, an effect of suppressing an electrolyte solution side reaction may be obtained.

Furthermore, a total amount of the additive of the present invention may be in a range of 1 wt % to 4 wt %, for example, 1.8 wt % to 4 wt % based on the total weight of the non-aqueous electrolyte solution for a lithium secondary battery.

The amount of the additive in the non-aqueous electrolyte solution may be determined by reaction specific surface areas of the positive electrode and the negative electrode, wherein, in a case in which the amount of the additive is 1 wt % or more as described above, expected effects resulting from the addition of each component may be met, for example, a stable SEI film may not only be formed on the surface of the negative electrode, but the gas generation reducing effect may also be achieved by suppressing the decomposition of the electrolyte solution caused by the reaction between the electrolyte solution and the negative electrode. Also, in a case in which the amount of the additive is 4 wt % or less, the gas generation reducing effect may not only be improved, but a stable SEI film may also be formed on the surface of the electrode while preventing a side reaction due to the excessive use of the additive and the resulting increase in resistance.

In a case in which the amount of the additive is greater than 4 wt %, the gas generation reducing effect may be further improved due to the excessive use of the additive, but, since an excessively thick layer is formed as the excessive amount of each component remains, an increase in resistance and a degradation in output may occur.

Thus, in a case in which the non-aqueous electrolyte solution according to the embodiment of the present invention includes the additive in an amount of 1 wt % to 4 wt % based on the total weight of the non-aqueous electrolyte solution while including the tetravinylsilane, the lithium difluorophosphate, and the 1,3-propylene sulfate, as the additive, in a weight ratio of 1:3 to 20:3 to 20, the decomposition of the electrolyte solution due to the reaction between the electrolyte solution and the negative electrode is minimized by forming a stable SEI film on the surface of the negative electrode, and accordingly, characteristics of the secondary battery may be improved.

Also, the non-aqueous electrolyte solution according to the embodiment of the present invention may further include an additional additive, if necessary, in order to further obtain effects of improving cycle life characteristics, low-temperature high-rate discharge characteristics, high-temperature stability, overcharge protection, and high-temperature swelling.

The additional additive is not particularly limited as long as it is an additive that may form a stable layer on the surfaces of the positive electrode and the negative electrode while not significantly increasing initial resistance.

The additional additive may include at least one selected from the group consisting of vinylene carbonate (VC), $LiBF_4$, 1,3-propane sultone (PS), and tetraphenylborate (TPB).

In a case in which the 1,3-propane sultone (PS) is included among the additional additives, a weight ratio of the tetravinylsilane:the 1,3-propane sultone (PS) is in a range of 1:5 to 1:15.

In a case in which the VC or $LiBF_4$ is included as the additional additive, a weight ratio of the tetravinylsilane:the VC or $LiBF_4$ is in a range of 1:1 to 1:3.

Particularly, the additional additive may be included in an amount of 0.1 wt % to 5 wt %, for example, 0.1 wt % to 4 wt % based on the total weight of the non-aqueous electrolyte solution for a lithium secondary battery. In a case in which the amount of the additional additive is less than 0.1 wt %, the effects to be achieved from the additional additive may be insignificant, and, in a case in which the amount of the additional additive is greater than 5 wt %, a side reaction due to the surplus additional additive may occur.

In general, in the secondary battery, lithium ions from a lithium metal oxide used as a positive electrode are intercalated while moving to a carbon-based electrode used as a negative electrode during initial charge, wherein, since the lithium ions are highly reactive, the lithium ions react with the carbon-based negative electrode and an electrolyte solution to form an organic material, $Li_2CO_3$, LiO, or LiOH, and these materials form an SEI film on the surface of the negative electrode. Once the SEI film is formed during initial charge, the SEI film may act as an ion tunnel that only passes the lithium ions between the electrolyte solution and the negative electrode while preventing a reaction of the lithium ions with the carbon-based negative electrode or other materials during repeated charge and discharge caused by the subsequent use of the battery. Since the SEI film blocks the movement of an organic solvent for an electrolyte solution having a high molecular weight, for example, EC, DMC, DEC, or PP, to the carbon-based negative electrode by the ion tunnel effect, these organic solvents are not inserted into the carbon-based negative electrode together with lithium ions, so that collapse of the structure of the carbon-based negative electrode can be prevented. That is, once the SEI film is formed, since the side reaction of the lithium ions with the carbon-based negative electrode or other materials does not occur again, an amount of the lithium ions, which is required during the charge and discharge caused by the subsequent use of the battery, may be reversibly maintained.

In other words, since a carbon material of the negative electrode reacts with the electrolyte solution during initial charge to form a passivation layer, it allows stable charge and discharge to be maintained without further decomposition of the electrolyte solution, and, in this case, the quantity of electric charge consumed for the formation of the passivation layer on the surface of the negative electrode is irreversible capacity, wherein it has features that do not react reversibly during discharge, and, for this reason, the lithium ion battery no longer exhibits an irreversible reaction after the initial charge reaction and may maintain a stable life cycle.

However, in a case in which the lithium secondary battery is stored at high temperature in a fully charged state (e.g., storage at 60° C. after charged to 100% at 4.2 V or more), it is disadvantageous in that the SEI film is gradually collapsed by electrochemical energy and thermal energy which are increased over time.

The collapse of the SEI film allows the surface of the negative electrode to be exposed, the exposed surface of the negative electrode is decomposed as it reacts with the carbonate-based solvent in the electrolyte solution, and thus, a continuous side reaction occurs.

The side reaction may continuously generate gas, and major gases generated in this case may be CO, $CO_2$, $CH_4$, and $C_2H_6$, wherein the gases generated may vary depending on the type of the negative electrode active material and, regardless of the type, the continuous gas generation increases the internal pressure of the lithium ion battery so that it becomes a cause of swelling of a battery thickness.

Thus, in the present invention, since the tetravinylsilane, the lithium difluorophosphate, and the 1,3-propylene sulfate are mixed in the above-described ratio and used as the additive during the preparation of the non-aqueous electrolyte solution, a stable layer is formed on the surface of the electrode to suppress the electrolyte solution side reaction, and thus, battery swelling during high-temperature storage may be prevented and battery characteristics may be improved.

Also, in an embodiment of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution of the present invention, and the positive electrode includes a lithium-nickel-manganese-cobalt-based oxide as a positive electrode active material.

Specifically, in the lithium secondary battery of the present invention, an electrode assembly may be prepared by sequentially stacking the positive electrode, the negative electrode, and the separator disposed between the positive electrode and the negative electrode, and, in this case, those prepared by a typical method and used in the preparation of the lithium secondary battery may all be used as the positive electrode, the negative electrode, and the separator which constitute the electrode assembly.

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material may include a lithium transition metal oxide represented by Formula 1 below.

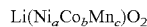   [Formula 1]

wherein, in Formula 1, $0.55 \leq a \leq 0.9$, $0.05 \leq b \leq 0.22$, $0.05 \leq c \leq 0.23$, and $a+b+c=1$.

Typical examples of the positive electrode active material may be $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.2}Co_{0.1})O_2$.

Furthermore, in addition to the lithium transition metal oxide represented by Formula 1, the positive electrode active material may further include any one of lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $1<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $1<Z1<2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.) or a compound of two or more thereof, if necessary.

The positive electrode active material may include $LiCoO_2$, $LiMnO_2$, $LiNiO_2$, or lithium nickel cobalt aluminum oxide (e.g., $Li(Ni_{0.8}Co_{0.15}Al_{0.05})O_2$, etc.).

The positive electrode active material may be included in an amount of 80 wt % to 99 wt %, for example, 93 wt % to 98 wt %, based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

Those sold under the names, such as acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon), may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, Li$_v$Fe$_2$O$_3$ (0≤v≤1), Li$_x$WO$_2$ (0≤x≤1), and Sn$_x$Me$_{1-x}$Me'$_y$O$_z$ (Me:manganese (Mn), Fe, Pb, or Ge; Me': Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may include Si, SiO$_x$ (0<x<2), a Si—Y alloy (where Y is an element selected from the group consisting of alkali metal, alkaline earth metal, a Group 13 element, a Group 14 element, transition metal, a rare earth element, and a combination thereof, and is not Si), Sn, SnO$_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of SiO$_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution of the present invention was prepared by adding a mixed additive (0.2 g of tetravinylsilane, 1.0 g of lithium difluorophosphate, and 1.0 g of 1,3-propylene sulfate) to 97.8 g of an organic solvent (ethylene carbonate (EC):ethyl methyl carbonate (EMC) =volume ratio of 3:7) in which 1 M $LiPF_6$ was dissolved (see Table 1 below).

(Secondary Battery Preparation)

A positive electrode active material ($Li(Ni_{0.6}Mn_{0.2}Co_{0.2})O_2$), a conductive agent (carbon black), and a binder (polyvinylidene fluoride) were added to N-methyl-2-pyrrolidone (NMP), as a solvent, at a weight ratio of 90:5:5 to prepare a positive electrode slurry (solid content of 40 wt %). One surface of a 20 μm thick positive electrode collector (Al thin film) was coated with the positive electrode slurry, dried, and roll-pressed to prepare a positive electrode.

Subsequently, a negative electrode active material (artificial graphite), a conductive agent (carbon black), and a binder (polyvinylidene fluoride) were added to N-methyl-2-pyrrolidone (NMP), as a solvent, at a weight ratio of 90:5:5 to prepare a negative electrode slurry (solid content of 40%). One surface of a 20 μm thick negative electrode collector (Cu thin film) was coated with the negative electrode slurry, dried, and roll-pressed to prepare a negative electrode.

Next, a coin-type battery was prepared by a typical method in which the above-prepared positive electrode and negative electrode were sequentially stacked with a polyethylene porous film, and a lithium secondary battery (battery capacity 340 mAh) was then prepared by injecting the prepared non-aqueous electrolyte solution of Example 1 thereinto.

Example 2

A non-aqueous electrolyte solution and a lithium secondary battery were prepared in the same manner as in Example 1 except that 0.1 g of tetravinylsilane, 1.5 g of lithium difluorophosphate, and 2 g of 1,3-propylene sulfate were included as a mixed additive in 96.4 g of an organic solvent during the preparation of the non-aqueous electrolyte solution (see Table 1 below).

Example 3

(Non-Aqueous Electrolyte Solution Preparation)

A non-aqueous electrolyte solution and a lithium secondary battery were prepared in the same manner as in Example 1 except that 0.05 g of tetravinylsilane, 0.75 g of lithium difluorophosphate, and 1.0 g of 1,3-propylene sulfate were included as an additive in 98.2 g of an organic solvent during the preparation of the non-aqueous electrolyte solution (see Table 1 below).

Example 4

A non-aqueous electrolyte solution and a lithium secondary battery were prepared in the same manner as in Example 1 except that 0.1 g of tetravinylsilane, 1.0 g of lithium difluorophosphate, and 1.5 g of 1,3-propylene sulfate were included as an additive in 97.4 g of an organic solvent during the preparation of the non-aqueous electrolyte solution (see Table 1 below).

Example 5

A non-aqueous electrolyte solution and a lithium secondary battery were prepared in the same manner as in Example 1 except that 0.1 g of tetravinylsilane, 1.0 g of lithium difluorophosphate, and 1.0 g of 1,3-propylene sulfate were included as an additive in 97.9 g of an organic solvent during the preparation of the non-aqueous electrolyte solution (see Table 1 below).

Example 6

A non-aqueous electrolyte solution and a lithium secondary battery were prepared in the same manner as in Example 1 except that 0.1 g of tetravinylsilane, 2.0 g of lithium difluorophosphate, and 1 g of 1,3-propylene sulfate were included as a mixed additive in 96.9 g of an organic solvent during the preparation of the non-aqueous electrolyte solution (see Table 1 below).

Comparative Example 1

A non-aqueous electrolyte solution and a lithium secondary battery were prepared in the same manner as in Example 1 except that 3 g of vinylene carbonate (VC) was included in 97 g of an organic solvent (ethylene carbonate (EC):ethyl methyl carbonate (EMC)=volume ratio of 3:7), in which 1 M $LiPF_6$ was dissolved, during the preparation of the non-aqueous electrolyte solution (see Table 1 below).

Comparative Example 2

A non-aqueous electrolyte solution and a lithium secondary battery were prepared in the same manner as in Example 1 except that 2 g of $LiBF_4$ was included in 98 g of an organic solvent (ethylene carbonate (EC):ethyl methyl carbonate (EMC)=volume ratio of 3:7), in which 1 M $LiPF_6$ was dissolved, during the preparation of the non-aqueous electrolyte solution (see Table 1 below).

Comparative Example 3

A non-aqueous electrolyte solution and a lithium secondary battery were prepared in the same manner as in Example 1 except that 0.5 g of tetravinylsilane, 1.25 g of lithium difluorophosphate, and 1.25 g of 1,3-propylene sulfate were included as a mixed additive in 97 g of an organic solvent during the preparation of the non-aqueous electrolyte solution (see Table 1 below).

Comparative Example 4

A non-aqueous electrolyte solution and a lithium secondary battery were prepared in the same manner as in Comparative Example 3 except that 0.1 g of tetravinylsilane, 0.5 g of lithium difluorophosphate, and 2.5 g of 1,3-propylene sulfate were included as a mixed additive in 96.9 g of an organic solvent during the preparation of the non-aqueous electrolyte solution (see Table 1 below).

Comparative Example 5

A non-aqueous electrolyte solution and a lithium secondary battery were prepared in the same manner as in Comparative Example 3 except that 0.1 g of tetravinylsilane, 0.3 g of lithium difluorophosphate, and 2.4 g of 1,3-propylene sulfate were included as a mixed additive in 97.15 g of an organic solvent during the preparation of the non-aqueous electrolyte solution (see Table 1 below).

Comparative Example 6

A non-aqueous electrolyte solution and a lithium secondary battery were prepared in the same manner as in Comparative Example 3 except that 0.15 g of tetravinylsilane, 2.1 g of lithium difluorophosphate, and 0.3 g of 1,3-propylene sulfate were included as a mixed additive in 97.45 g of an organic solvent during the preparation of the non-aqueous electrolyte solution (see Table 1 below).

Comparative Example 7

A non-aqueous electrolyte solution and a lithium secondary battery were prepared in the same manner as in Comparative Example 3 except that 1.5 g of lithium difluorophosphate and 1.5 g of 1,3-propylene sulfate were included as a mixed additive in 97 g of an organic solvent during the preparation of the non-aqueous electrolyte solution (see Table 1 below).

Comparative Example 8

A non-aqueous electrolyte solution and a lithium secondary battery were prepared in the same manner as in Comparative Example 3 except that 0.25 g of tetravinylsilane and 2.5 g of 1,3-propylene sulfate were included as a mixed additive in 97.25 g of an organic solvent during the preparation of the non-aqueous electrolyte solution (see Table 1 below).

Comparative Example 9

A non-aqueous electrolyte solution and a lithium secondary battery were prepared in the same manner as in Comparative Example 3 except that 0.25 g of tetravinylsilane and 2.5 g of lithium difluorophosphate were included as a mixed additive in 97.25 g of an organic solvent during the preparation of the non-aqueous electrolyte solution (see Table 1 below).

Comparative Example 10

A negative electrode, a positive electrode, and a lithium secondary battery including the negative electrode and the positive electrode were prepared in the same manner as in Example 1 except that a lithium cobalt composite oxide ($LiCoO_2$) instead of $Li(Ni_{0.6}Mn_{0.2}Co_{0.2})O_2$, was included as a positive electrode active material during the preparation of the secondary battery.

EXPERIMENTAL EXAMPLES

Experimental Example 1

Cycle Life Characteristic Test

Each of the secondary batteries prepared in Examples 1 to 6 and Comparative Examples 1 to 10 was charged at 1 C to 4.25 V/55 mA under a constant current/constant voltage (CC/CV) condition at 45° C. and then discharged at a constant current (CC) of 2 C to a voltage of 3.0 V (1,000 cycles/1 cycle×100) to measure 100 cycle lifetime at high temperature, and the results thereof are presented in Table 1 below.

Also, each of the secondary batteries prepared in Examples 1 to 6 and Comparative Examples 1 to 10 was charged at 1 C to 4.25 V/55 mA under a CC/CV condition at 25° C. and then discharged at a CC of 2 C to a voltage of 3.0 V (1,000 cycles/1 cycle×100) to measure 100 cycle life characteristics at room temperature, and the results thereof are presented in Table 1 below.

Experimental Example 2

High-Temperature Storage Characteristic Test

After each of the secondary batteries prepared in Examples 1 to 6 and Comparative Examples 1 to 10 was stored at a high temperature of 60° C. for 16 weeks, each secondary battery was charged at 1 C. to 4.25 V/55 mA under a constant current/constant voltage (CC/CV) condition at room temperature and then discharged at a constant current (CC) of C to a voltage of 2.5 V, and capacity after high-temperature storage was measured by calculating discharge capacity after 16 weeks as a percentage (capacity after 16 weeks/initial discharge capacity×100 (%)). The results thereof are presented in Table 1 below.

Also, after each of the secondary batteries prepared in Examples 1 to 6 and Comparative Examples 1 to 10 was stored at a high temperature of 60° C. for 16 weeks, output was measured by a voltage difference generated by discharging each secondary battery at 3 C. for 10 seconds at a state of charge (SOC) of 50% at room temperature, output after 16 weeks storage was calculated as a percentage (output after 16 weeks/initial output×100), and the results thereof are presented in Table 1 below.

Furthermore, after each of the secondary batteries prepared in Examples 1 to 6 and Comparative Examples 1 to 10 was stored at a high temperature of 60° C. for 16 weeks, a change in thickness was measured, and the results thereof are presented in Table 1 below.

TABLE 1

| | | For-average electrolyte solution | | | | | | |
| --- | --- | --- | --- | --- | --- | --- | --- | --- |
| | | Organic solvent | | | | | | |
| | Positive electrode active material | Type (volume ratio) | Amount added (g) | Amount of additive added (g) | | | | Total amount of additive (g) |
| | | | | TVS | LiDFP | PPS | Others | |
| Example 1 | $Li(Ni_{0.6}Mn_{0.2}Co_{0.2})O_2$ | EC:EMC = 3:7 | 97.8 | 0.2 | 1.0 | 1.0 | — | 2.2 |
| Example 2 | $Li(Ni_{0.6}Mn_{0.2}Co_{0.2})O_2$ | EC:EMC = 3:7 | 96.4 | 0.1 | 1.5 | 2.0 | — | 3.6 |
| Example 3 | $Li(Ni_{0.6}Mn_{0.2}Co_{0.2})O_2$ | EC:EMC = 3:7 | 98.2 | 0.05 | 0.75 | 1.0 | — | 1.8 |
| Example 4 | $Li(Ni_{0.6}Mn_{0.2}Co_{0.2})O_2$ | EC:EMC = 3:7 | 97.4 | 0.1 | 1.0 | 1.5 | — | 2.6 |
| Example 5 | $Li(Ni_{0.6}Mn_{0.2}Co_{0.2})O_2$ | EC:EMC = 3:7 | 97.9 | 0.1 | 1.0 | 1.0 | — | 2.1 |
| Example 6 | $Li(Ni_{0.6}Mn_{0.2}Co_{0.2})O_2$ | EC:EMC = 3:7 | 96.9 | 0.1 | 2.0 | 1.0 | — | 3.1 |
| Comparative Example 1 | $Li(Ni_{0.6}Mn_{0.2}Co_{0.2})O_2$ | EC:EMC = 3:7 | 97 | — | — | — | VC 3.0 | 3.0 |
| Comparative Example 2 | $Li(Ni_{0.6}Mn_{0.2}Co_{0.2})O_2$ | EC:EMC = 3:7 | 98 | — | — | — | $LiBF_4$ 2.0 | 2.0 |
| Comparative Example 3 | $Li(Ni_{0.6}Mn_{0.2}Co_{0.2})O_2$ | EC:EMC = 3:7 | 97 | 0.5 | 1.25 | 1.25 | — | 3.0 |
| Comparative Example 4 | $Li(Ni_{0.6}Mn_{0.2}Co_{0.2})O_2$ | EC:EMC = 3:7 | 96.9 | 0.1 | 0.5 | 2.5 | — | 3.1 |
| Comparative Example 5 | $Li(Ni_{0.6}Mn_{0.2}Co_{0.2})O_2$ | EC:EMC = 3:7 | 97.15 | 0.1 | 0.3 | 2.4 | — | 2.85 |
| Comparative Example 6 | $Li(Ni_{0.6}Mn_{0.2}Co_{0.2})O_2$ | EC:EMC = 3:7 | 97.45 | 0.15 | 2.1 | 0.3 | — | 2.55 |
| Comparative Example 7 | $Li(Ni_{0.6}Mn_{0.2}Co_{0.2})O_2$ | EC:EMC = 3:7 | 97 | — | 1.5 | 1.5 | — | 3 |
| Comparative Example 8 | $Li(Ni_{0.6}Mn_{0.2}Co_{0.2})O_2$ | EC:EMC = 3:7 | 97.25 | 0.25 | — | 2.5 | — | 2.75 |
| Comparative Example 9 | $Li(Ni_{0.6}Mn_{0.2}Co_{0.2})O_2$ | EC:EMC = 3:7 | 97.25 | 0.25 | 0.25 | — | — | 2.75 |
| Comparative Example 10 | $LiCoO_2$ | EC:EMC = 3:7 | 97.8 | 0.2 | 1 | 1 | — | 2.2 |

| | High-temperature storage characteristics (%) 16 weeks | | | 100 cycle life characteristics (%) | |
| --- | --- | --- | --- | --- | --- |
| | | | Battery | | |
| | Capacity | Output | thickness increase rate | Low-temperature lifetime | High-temperature lifetime |
| Example 1 | 86.7 | 87.1 | 14 | 82.9 | 79.4 |
| Example 2 | 87.2 | 91.1 | 13.7 | 81.4 | 78.8 |
| Example 3 | 89.5 | 92.9 | 15.8 | 81.1 | 76.7 |
| Example 4 | 87.4 | 92.0 | 14.3 | 84.0 | 78.6 |
| Example 5 | 87.2 | 92.3 | 14.2 | 83.2 | 77.2 |
| Example 6 | 80.7 | 81.7 | 17.3 | 78.5 | 72.4 |
| Comparative Example 1 | 65.8 | 67.2 | vent | 68.2 | 51.3 |
| Comparative Example 2 | 71.1 | 63.4 | 29.3 | 61.5 | 52.5 |
| Comparative Example 3 | 81.2 | 79.6 | 14.6 | 68.2 | 71.1 |
| Comparative Example 4 | 80.7 | 81.5 | 18.3 | 66.3 | 64.2 |
| Comparative Example 5 | 81.3 | 78.1 | 18.4 | 64.8 | 63.1 |
| Comparative Example 6 | 81.3 | 80.6 | 19.7 | 74.8 | 69.3 |
| Comparative Example 7 | 73.1 | 81.5 | 28.7 | 75.6 | 71.2 |
| Comparative Example 8 | 74.2 | 76.2 | 19.5 | 59.2 | 56.8 |
| Comparative Example 9 | 78.3 | 79.2 | 22.6 | 66.3 | 63.2 |
| Comparative Example 10 | 72.8 | 77.2 | 31.7 | 67.6 | 66.2 |

As illustrated in Table 1, when the life characteristics after 1,000 cycles were examined, it may be confirmed that the secondary batteries prepared in Examples 1 to 6 had significantly better room-temperature and high-temperature cycle life characteristics than the secondary batteries prepared in Comparative Examples 1 to 10.

Also, when the high-temperature storage characteristics were examined, it may be confirmed that capacity and output characteristics of the secondary batteries prepared in Examples 1 to 6 were improved in comparison to those of the secondary batteries prepared in Comparative Examples 1 to 10.

Particularly, with respect to the secondary battery of Comparative Example 10 which included LCO as a positive electrode active material, since stability of the SEI film formed on the surface of the positive electrode was relatively lower than those of the secondary batteries of Examples 1 to 6 including the lithium-nickel-manganese-cobalt-based oxide, it may be understood that the cycle life characteristics and high-temperature storage characteristics were degraded.

The invention claimed is:

1. A non-aqueous electrolyte solution for a lithium secondary battery, the non-aqueous electrolyte solution comprising:
    an ionizable lithium salt;
    an organic solvent; and
    an additive,
    wherein the additive is a mixed additive which includes tetravinylsilane, lithium difluorophosphate, and 1,3-propylene sulfate in a weight ratio of 1:3 to 20:3 to 20, and
    the additive is included in an amount of 1 wt % to 4 wt % based on a total weight of the non-aqueous electrolyte solution.

2. The non-aqueous electrolyte solution for a lithium secondary battery of claim 1, wherein the weight ratio of the tetravinylsilane:the lithium difluorophosphate:the 1,3-propylene sulfate is in a range of 1:3 to 17:5 to 20.

3. The non-aqueous electrolyte solution for a lithium secondary battery of claim 1, wherein the weight ratio of the tetravinylsilane:the lithium difluorophosphate:the 1,3-propylene sulfate is in a range of 1:5 to 15:5 to 20.

4. The non-aqueous electrolyte solution for a lithium secondary battery of claim 1, wherein the additive is included in an amount of 1.8 wt % to 4 wt % based on the total weight of the non-aqueous electrolyte solution for a lithium secondary battery.

5. The non-aqueous electrolyte solution for a lithium secondary battery of claim 1, further comprising at least one additional additive selected from the group consisting of vinylene carbonate, $LiBF_4$, 1,3-propane sultone, and tetraphenylborate.

6. The non-aqueous electrolyte solution for a lithium secondary battery of claim 5, wherein the additional additive is included in an amount of 0.1 wt % to 5 wt % based on the total weight of the non-aqueous electrolyte solution.

7. The non-aqueous electrolyte solution for a lithium secondary battery of claim 5, wherein, in a case in which the 1,3-propane sultone is included as the additional additive, a weight ratio of the tetravinylsilane:the 1,3-propane sultone is in a range of 1:5 to 1:15.

8. The non-aqueous electrolyte solution for a lithium secondary battery of claim 5, wherein, in a case in which the vinylene carbonate or $LiBF_4$ is included as the additional additive, a weight ratio of the tetravinylsilane:the vinylene carbonate or $LiBF_4$ is in a range of 1:1 to 1:3.

9. A lithium secondary battery comprising a negative electrode, a positive electrode, a separator disposed between the negative electrode and the positive electrode, and a non-aqueous electrolyte solution,
    wherein the non-aqueous electrolyte solution comprises the non-aqueous electrolyte solution for a lithium secondary battery of claim 1, and
    the positive electrode comprises a lithium-nickel-manganese-cobalt-based oxide as a positive electrode active material.

10. The lithium secondary battery of claim 9, wherein the positive electrode active material comprises a lithium transition metal oxide represented by Formula 1:

$$Li(Ni_aCo_bMn_c)O_2 \qquad \text{[Formula 1]}$$

wherein, in Formula 1,
0.55≤a≤0.9, 0.05≤b≤0.22, 0.05≤c≤0.23, and a+b+c=1.

11. The lithium secondary battery of claim 10, wherein the positive electrode active material comprises at least one of $Li(Ni_{0.6}Mn_{0.2}Co_{0.2})O_2$, $Li(Ni_{0.7}Mn_{0.15}Co_{0.15})O_2$, $Li(Ni_{0.8}Mn_{0.1}Co_{0.1})O_2$.

* * * * *